United States Patent [19]
Rothrock

[11] 3,794,431
[45] Feb. 26, 1974

[54] METHOD AND APPARATUS FOR STANDARDIZING OPTICALLY PUMPED LASER MATERIALS

[75] Inventor: Larry R. Rothrock, Poway, Calif.

[73] Assignee: Union Carbide Corporation, New York, N.Y.

[22] Filed: Aug. 17, 1972

[21] Appl. No.: 281,390

Related U.S. Application Data

[63] Continuation of Ser. No. 47,430, June 18, 1970, abandoned.

[52] U.S. Cl. .............................. 356/256, 331/94.5
[51] Int. Cl. ............................................. H01e 3/00
[58] Field of Search ................ 356/256; 331/94.5 D

[56] References Cited
OTHER PUBLICATIONS

Edwards "An Automatic Tracer of Characteristic Curves for Optically Pumped Lasers," Jour. Sci. Inst., Vol. 44, pp. 309-311, April, 1967.

Entuhov et al. "Pulsed Ruby Lasers," Lasers, Vol. 1, Ed. by Levine, Marcel Dekker, Inc., New York, 1966, pg. 22.

*Primary Examiner*—Edward S. Bauer
*Attorney, Agent, or Firm*—Harrie E. Humphreys

[57] ABSTRACT

A system for standardizing optically pumped laser materials includes a given light pumping lamp of defined energy output, a given access area in fixed light coupling realtionship with the lamp for receiving laser material, and a resonant optical cavity for the access area of given defined characteristics. The arrangement is such that any reflected radiation from the lamp is prohibited from passing into the access area. Successive laser materials may then be received in the access area and subjected to substantially identical light pumping conditions to cause stimulated emission of laser light and the output laser light of each material monitored so that the materials may be categorized in accordance with their output characteristics.

7 Claims, 2 Drawing Figures

PATENTED FEB 26 1974 3,794,431

INVENTOR
LARRY R ROTHROCK

METHOD AND APPARATUS FOR STANDARDIZING OPTICALLY PUMPED LASER MATERIALS

This application is a continuation of pending application Ser. No. 047,430 filed June 18, 1970, and now abandoned.

This invention relates to lasers and more particularly to a novel method and apparatus for standardizing optically pumped laser materials.

BACKGROUND OF THE INVENTION

In the manufacture of laser media or laser materials such as crystal rods, it is desirable to be able to categorize the rods as to their characteristics. In the interests of uniformity of production in crystal growing operations, by way of example, the specifications of the laser rods should be definable with some degree of accuracy. Thus even though laser rod crystals may be made of the same material and the crystal growing operation carefully controlled so as to attempt to obtain identical lengths and rod diameters, there still can exist differences in the rods.

While the rods may be tested optically and/or chemically in an effort to group rods of like characteristics, such optical and/or chemical operations have not been feasible or easily carried out.

Another approach is to provide a laser apparatus within which different crystals may be substituted. The apparatus itself must have defined components so that it is capable of generating the same data in repeating the same experiment. Thus if the light pumping characteristics, for example, can be made consistent, different laser rods or materials may be substituted in the apparatus and the output radiation monitored directly thereby enabling the desired categorization of a plurality of manufactured laser materials.

This approach has met with considerable difficulty primarily because the laser head or light cavity within which the pumping lamp and laser material are located simply is not consistent in successive light pumping operations to a degree which enables proper categorization of different laser materials successively substituted therein. The principal difficulty resides in th head reflecting surfaces which direct light from the pumping lamp into the crystal rod. The reflectivity of these surfaces varies over a spectrum of wave length and thus a repeatable set of conditions by any conventional laser apparatus cannot be realized.

A further difficulty in attempting to use a conventional type laser is the fact that laser materials, especially crystalline type solid state rods, may vary substantially in length and thus some cannot be utilized without providing a new geometry capable of receiving the laser material. Thus it would be required for practical categorization purposes to provide at least two complete laser systems in order to accomodate the various lengths of laser rods to be categorized.

BRIEF DESCRIPTION OF THE PRESENT INVENTION

With the foregoing in mind, it is a primary purpose of the present invention to provide a method and apparatus which will enable the standardization of optically pumped laser materials in which the same characteristics may be repeatedly generated so that, by monitoring the output of various laser materials utilized in the system, they may be easily categorized.

The essence of the invention resides in the prohibiting of substantially all reflected radiation from the light pump lamp source from passing into the area within which a laser material is to be received. Thus only direct radiation from the pumping lamp is passed to the laser material and under these conditions a consistent energy per unit length of lamp is assured.

The foregoing is achieved by simply eliminating any type of laser head structure as normally characterizes operational lasers so that the problems of reflected radiation (which reflected radiation is almost impossible to make consistent) is wholly removed. In addition, the mounting structure and other components of the system are so devised as to prohibit substantially all radiation reflected from such components from reaching the laser material.

In addition, the system is made in modular form so that the access area for the laser material can be increased by simply adding an additional lamp to the system without having to change any of the other components. Such is feasible since there is not any laser head structure which would prevent the modular addition of a second lamp in alignment with the first lamp thereby enabling accomodation of longer laser rods.

The broad method concept thus contemplates the steps of providing a first given light pumping lamp means generating energy pulses of consistent pulse shape and duration; defining a first access area in fixed light coupling relationship with the lamp means for receiving laser material; defining a resonant optical cavity for the first access area of given characteristics; and prohibiting substantially all reflected radiation from the lamp means from passing into the access area. Successive laser materials may then be received in the access area and subjected to substantially identical light pumping conditions to cause stimulated emission of laser light, the output laser light of each material being monitored so that the materials may be categorized in accordance with their output characteristics.

BRIEF DESCRIPTION OF THE DRAWINGS

A better understanding of the invention will be had by now referring to a preferred embodiment as illustrated in the accompanying drawings, in which.

Figure 1:
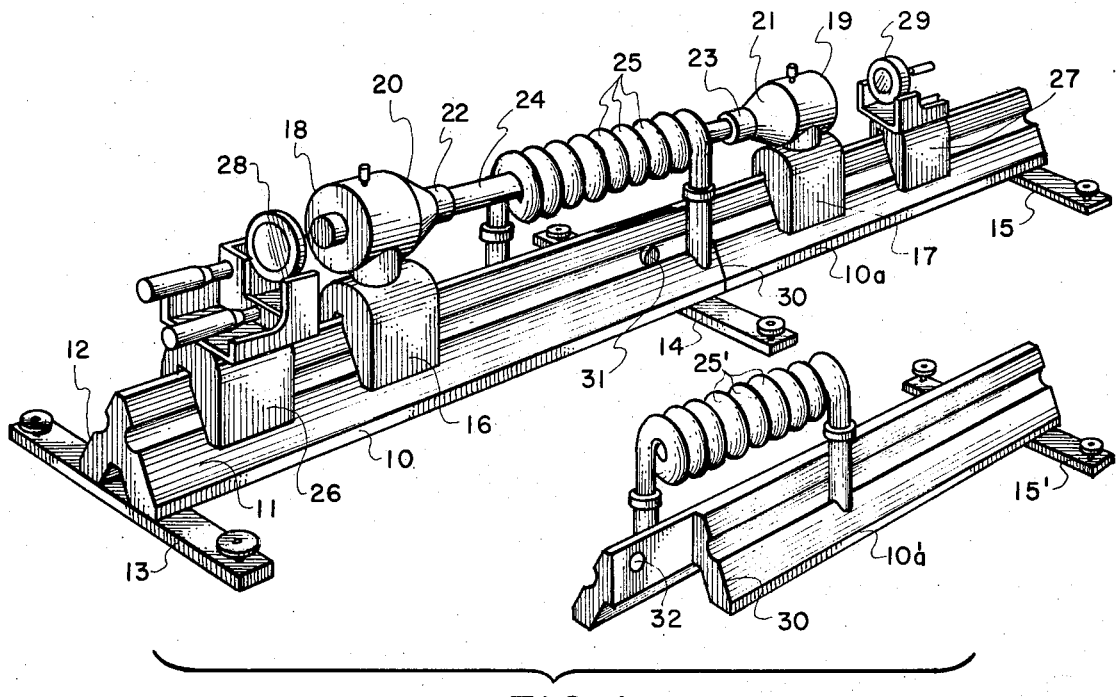
FIG. 1 is a perspective view of an apparatus in modular form for standardizing optically pumped laser materials; and, FIG. 2 is a schematic electrical circuit diagram showing the manner in which the light pump sources are energized from a power supply in accord with the invention.

DETAILED DESCRIPTION OF THE PREFERRED EMBODIMENT:

Referring to FIG. 1 there is shown a mounting means in the form of an elongated rail separable into sections 10 and 10a. This structure includes sides 11 and 12 sloping away from its top surface to define a generally triangular shape in cross-section. Foot support structures such as indicated at 13, 14, and 15 support the sections 10 and 10a in alignment.

As shown, the mounting means also includes slideable members 16 and 17 supporting laser material holding members 18 and 19 having opposed beveled front surfaces 20 and 21. The holding members may include cylindrical insert spacers 22 and 23 for surrounding opposite ends of a laser material such as a crystal rod 24 to support the same as shown. In the event a larger diameter rod 24 were to be supported, the cylindrical spacer inserts 22 and 23 could be removed and the opposite ends of such rods supported directly in the rod holding members 18 and 19.

In the particular embodiment illustrated, the light pumping lamp means comprises a helical lamp 25, the opening within the various turns of the helix defining an access area for receiving the laser rod 24.

An optical resonant cavity for the laser material includes guide blocks 26 and 27 supporting end mirrors 28 and 29. The arrangement is such that spacing between the end mirrors may be properly adjusted by slideably adjusting the blocks 26 and 27.

It will be noted in FIG. 1 that the separation of the guide rail into the sections 10 and 10a takes place at a jogged division line 30 adjacent to one end of the lamp 25. A modular rail section 10a' is provided with its near end as viewed in FIG. 1 cut to follow the jog deifning the division line 30 so that the same may be substituted for the section 10a of FIG. 1 and properly positioned in alignment with the section 10. The sections may be secured together by a pin 31 passing into a cooperating bore in the section 10 and an aligned bore 32 shown in the modular section 10a'.

The modular section 10a' includes a second lamp of the helical type 25' which is identical in dimensioning and number of turns as the helical lamp 25.

By the foregoing arrangement, the lamp 25' is in physical alignment with the lamp 25 and the access area for receiving a laser rod thereby substantially doubled in length. It is understood, of course, that the rod holder guide 17 and rod holder 19 as well as the end mirror guiding block 27 and end mirror 29 would be reassembled on the modular section 10a' to properly define the resonant optical cavity for the system.

It is to be noted that the structure as described that there is no surrounding laser head or any type of reflecting surface as normally characterizes lasers. While there is unquestionably a loss of light as a consequence of this design, the helical lamp structure still provides sufficient pumping energy to effect lasing of the laser material. The advantages of eliminating any type of reflecting enclosure is twofold: first, the erratic characteristics of light reflected from the surface for pumping the laser rod are avoided so that repeatability of the pumping energy is assured and, second, the modular addition of a lamp to thereby double the access area for the crystal rod is easily carried out.

Figure 2:
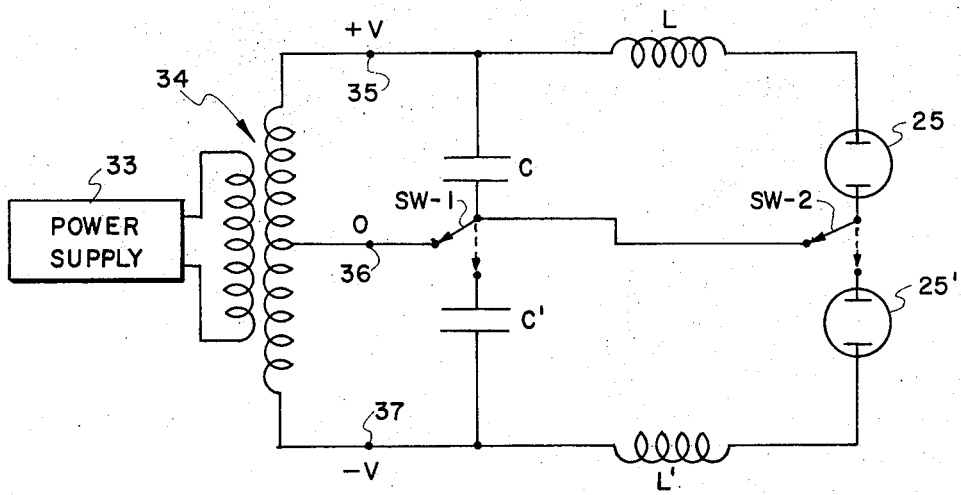

FIG. 2 illustrates a power supply circuit for energizing one or both of the lamps of FIG. 1. As shown, a power supply 33 passes energy into a transformer 34 the secondary of which is center tapped. This arrangement provides a positive voltage on the upper line at terminal point 35, a zero or ground potential on the terminal point 36 of the center tap, and a negative voltage on a terminal 37 on the lower line. The positive an negative voltages are equal in absolute magnitude so that effectively a voltage of 2V appears across the outer terminals of the secondary and a voltage of V will appear between the terminals 35 and 36.

Capacitances C and C' are connected between the upper and lower lines to suitable terminals cooperating with a first switch SW-1. Inductances L and L' in turn are included in the upper and lower lines to connect to suitable first terminals of the lamps 25 and 25'. The inner or second terminals of the lamps cooperate with a second switch SW-2.

With the foregoing circuit, it will be evident that when the switches SW-1 and SW-2 are in their solid line positions, the voltage V will be applied to the lamp 25 symbolically representing the helical lamp structure 25 of FIG. 1. When the switches SW-1 and SW-2 are in their dotted line positions, doubled voltage or 2V will be connected across the lamps symbolically illustrated at 25 and 25', the lamps themselves being connected in series. A simple calculation will show that by doubling the voltage across the series connected lamps while making sure that C and C' are equal and L and L' are equal provides the same energy per unit lamp length as occurs when only the single lamp 25 is energized with the voltage V.

OPERATION

All of the various components described in FIGS. 1 and 2 preferably constitute standard items so that reproducibility of the particular laser system is assured. The various components are assembled on the guide rail structure as illustrated in FIG. 1. The power to the helical lamp 25 is known and the characteristics of the lamp are known such that the lamp generates energy pulses of consistent pulse shape and duration. The resonant optical cavity is carefully and repeatedly adjustable by the guide blocks 26 and 27 as described in FIG. 1 so that consistent optical cavity dimensions are assured.

Assuming that a group of laser rods are to be categorized, they may be successively inserted in the rod holding members 18 and 19 and subjected to substantially identical light pumping conditions to cause stimulated emission of laser light. The output of the successive rods is monitored so that the material can readily be categorized in accord with their output characteristics.

In the event that longer laser rods are to be properly grouped according to output characteristics, it is a simple matter to substitute the modular section 10a' of FIG. 1 for the section 10a thereby effectively doubling the access area for the laser rods. In these circumstances, the lamps are connected in series and the switches SW-1 and SW-2 thrown to their dotted line positions as shown in FIG. 2 so that twice the voltage is applied to the series connected lamps. The energy per unit lamp length in the access area is thus maintained constant and longer laser rods may be categorized in the same manner as the shorter rods.

In addition, the modular feature of cylindrical inserts such as 22 and 23 enables slightly different diameter rods to be properly categorized without having to alter other components of the system.

From the foregoing description, it will be evident that the present invention has provided a standardization system for optically pumped laser materials wherein the desirable feature of being able to categorize crystals as they are to be actually used as lasers is realized. The prohibiting of substantially all reflected light from the lamp pumping system by the sloping surfaces of the guide rail, the opposed beveled front surfaces of the rod holder, and most importantly the absence of any type of head enclosure as normally characterizes conventional lasers assures excellent repeatability in generating data for the successive rods or laser materials to be tested.

While the preferred embodiment of the invention has been described in conjunction with crystal rods constituting the laser material and cooperating helical type lamps for pumping the same, it should be understood that the principles of the invention are applicable to other types of light pumped laser materials such as liquid lasers or other lamp configurations such as linear lamps positioned so as to assure light coupling relationship with the access area receiving the laser material. The invention, accordingly, is not to be thought of as limited to the specific embodiment set forth merely for illustrative purposes.

I claim:

1. A method of standardizing optically pumped laser materials, comprising the steps of:
    a. providing a light pumping lamp means of given output energy per unit length;
    b. defining an access area in given light coupling relationship with said lamp means for receiving laser material;
    c. defining a resonant optical cavity for said access area of given characteristics; and
    d. prohibiting substantially all reflected radiation from said lamp means from passing into said access area by at least the steps of (i) eliminating reflective laser head enclosures, (ii) providing sloping surfaces on guide rails which carry structural components defining said optical cavity to direct reflected light away from said laser material, and (iii) providing beveled surfaces on holders supporting said laser material to direct reflected light away from said laser material, whereby successive laser materials may be caused to operate as lasers under substantially identical conditions thereby enabling the laser materials to be categorized in accord with differences in their output characteristics.

2. A method of standardizing optically pumped laser materials, comprising the steps of:
    a. providing a given light pumping lamp means generating energy pulses of consistent pulse shape and duration;
    b. defining a first access area in fixed light coupling relationship with said lamp means for receiving laser material;
    c. defining a resonant optical cavity for said first access area of given characteristics; and
    d. prohibiting substantially all reflected radiation from said first lamp means from passing into said access area by at least the steps of (i) eliminating reflective laser head enclosures, (ii) providing sloping surfaces on guide rails which carry structural components defining said optical cavity to direct reflected light away from said laser material, and (iii) providing beveled surfaces on holders supporting said laser material to direct reflected light away from said laser material, whereby successive laser materials may be received in said access area and subjected to substantially identical light pumping conditions to cause stimulated emission of light, the output laser light of each material being monitored so that the laser material may be categorized in accordance with their output characteristics.

3. The method of claim 2, including the steps of providing a second light pumping lamp means of substantially identical dimensions and characteristics as said first mentioned lamp means; connecting said second light pumping lamp means in series with said first light pumping lamp means and physically positioning it in alignment with said first light pumping lamp means to thereby double the length of the first access area; and doubling the voltage supplied to the first and second lamp means when connected in series over that when only the first lamp means is used, so that the energy per unit length of lamp is unchanged, whereby laser materials of greater length than can be accomodated in said first access area may be categorized by light pumping with said first and second lamp means.

4. An apparatus for standardizing optically pumped laser materials comprising, in combination, which combination does not include a reflective laser head enclosure:
    a. a light pump lamp means of given repeatable output energy;
    b. mounting means for supporting a laser material in light coupling relationship with said light pump lamp means; and
    c. first and second end mirrors supported on said mounting means in positions to define an optical resonant cavity for laser material when supported on said mounting means;
    d. said mounting means including (i) an elongated guiding rail having sides sloping away from its top surface to define a general triangular shape in cross-section so that any light from said lamp means striking the sides of said rail is reflected away from laser material when supported above said rail and (ii) laser material holding members having opposed beveled front surfaces surrounding the opposite ends of laser material when supported thereby so that light striking said beveled front surfaces is reflected away from laser material when said laser material is secured in said holding members, said light pump lamp means providing direct radiation over a given length parallel to said rail between said holding members, the energy per unit length being constant so that laser materials of different lengths received in said holding members are subject to the same light pumping conditions, whereby substantially anly direct radiation from said light pump lamp means is passed to said laser material and successive laser materials may be caused to operate as lasers under substantially identical conditions thereby enabling the laser materials to be categorized in accord with diffrences in their output characteristics.

5. An apparatus according to claim 4, in which said elongated guiding rail is separable into two sections at a point adjacent to one end of said lamp means and which includes a modular rail section comprising an additional lamp means substantially identical in length and characteristics to the first mentioned lamp means, whereby said modular rail section can be substituted for a section of said elongated guiding rail to position said additional lamp means in alignment with said first mentioned lamp means and thereby double the length of light coupling to laser material mounted in said holding members, the lamps being connected in series and the voltage supplied thereto being doubled so that the energy per unit length remains constant whereby laser materials of longer length than can be accommodated in said first mentioned lamp means may be light pumped under the same conditions by both of said lamp means.

6. An apparatus according to claim 5, in which said lamp means and additional lamp means each comprise a helical lamp of said given length, the central opening defined by the turns of the helical lamp defining an access area for receiving the laser material.

7. An apparatus according to claim 6, in which said laser materials comprise elongated crystals in the form of rods, said holding members including cylindrical insert spacers for enabling the holding of different diameter rods by the portions of the holding members surrounding the ends of the laser material.

* * * * *

Dedication 3,794,431.—*Larry R. Rothrock*, Poway, Calif. METHOD AND APPARATUS FOR STANDARDIZING OPTICALLY PUMPED LASER MATERIALS. Patent dated Feb. 26, 1974. Dedication filed Nov. 14, 1974, by the assignee, *Union Carbide Corporation*.

Hereby dedicates to the Public the entire remaining term of said patent.

[*Official Gazette June 24, 1975.*]